United States Patent
Scuteri et al.

(10) Patent No.: US 6,896,548 B2
(45) Date of Patent: May 24, 2005

(54) MULTIPLE SIM CARD HOLDING APPARATUS

(75) Inventors: Ilario Scuteri, Soverato (IT); Luciano Di Maio, Sorrento (IT); Federica Forneris, Fossano (IT); Michele Santoro, Castelvetrano (IT)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/682,061

(22) Filed: Oct. 9, 2003

(65) Prior Publication Data

US 2004/0092149 A1 May 13, 2004

(51) Int. Cl.⁷ .............................................. H01R 13/66
(52) U.S. Cl. ..................... 439/541.5; 439/326; 439/630
(58) Field of Search ............................. 439/541.5, 630, 439/326

(56) References Cited

U.S. PATENT DOCUMENTS

| | | | | |
|---|---|---|---|---|
| 5,176,523 A | * | 1/1993 | Lai | 439/630 |
| 5,901,049 A | | 5/1999 | Schmidt et al. | |
| 6,146,195 A | | 11/2000 | Chang | |
| 6,468,101 B2 | * | 10/2002 | Suzuki | 439/326 |
| 6,471,550 B2 | * | 10/2002 | Maiterth et al. | 439/631 |
| 6,540,523 B1 | * | 4/2003 | Kung et al. | 439/64 |
| 6,568,960 B2 | * | 5/2003 | Bricaud et al. | 439/630 |
| 6,623,305 B2 | * | 9/2003 | Chun-Lung | 439/630 |
| 2002/0065106 A1 | | 5/2002 | Bishop et al. | |

FOREIGN PATENT DOCUMENTS

| | | |
|---|---|---|
| DE | 3736258 A1 | 5/1989 |
| DE | 29607253 U1 | 7/1996 |
| DE | 200009217 U1 | 8/2000 |
| DE | 19913923 A1 | 9/2000 |
| EP | 0782089 A2 | 7/1997 |
| EP | 1004979 A1 | 5/2000 |
| EP | 1079324 A1 | 2/2001 |
| EP | 1085606 A2 | 3/2001 |
| EP | 1204064 A2 | 5/2002 |
| WO | WO 01/03052 A1 | 1/2001 |
| WO | WO 02/05583 A1 | 1/2002 |

* cited by examiner

Primary Examiner—Tho D. Ta
(74) Attorney, Agent, or Firm—Randall S. Vaas

(57) ABSTRACT

A multiple card holding apparatus (10) includes a first bracket (12), a second bracket (22) oriented in opposition to the first bracket (12); and a separation member (30), disposed between the first bracket (12) and the second bracket (22), forming a first holding region (31) and a second holding region (32) with the first bracket (12) and the second bracket (22).

12 Claims, 6 Drawing Sheets

MULTIPLE SIM CARD HOLDING APPARATUS

FIELD OF THE INVENTION

The present invention pertains to card holders and, more particularly, to an apparatus for holding multiple cards.

BACKGROUND OF THE INVENTION

Cards, such as subscriber identity module (SIM) cards, smart cards and memory cards carry an integrated circuit (IC). These cards are installed or otherwise inserted into mobile communication devices (e.g. cellular telephones) which contain subscriber related data. For example, these cards are used in those cellular telephones that conform to the global system for mobile communications (GSM) standard, the third generation code division multiple access (CDMA) standard, or other products, and may include many personal communication services (PCS) applications. GSM cellular telephones, or other SIM based devices are typically not fully functional without the SIM cards being inserted. Each SIM card contains a body, an IC that houses a processor and a memory, the memory storing algorithms, and the processor operational to encrypt voice and data transmissions. The memory also contains data that identifies the caller as being a legitimate user of the mobile network.

Conventionally, SIM cards are maintained within a cellular telephone in a card holder. However, with the increasing amount of features and capabilities provided by cellular telephones, multiple cards are oftentimes required to provide appropriate functionality and user flexibility. Conventional multiple SIM card design employ a housing structure where the plurality of SIM cards are placed next to each other (e.g. side-by-side) on the circuit board of the cellular telephone. This has the effect of substantially reducing the amount of available area for other circuits; thereby, potentially having an adverse effect on the overall functionality that may be provided by the cellular telephone. In addition, employing multiple SIM cards increases the overall size of the cellular telephone. With the ever increasing importance of scaling down, or reducing, the size of cellular telephones, side-by-side placement of the SIM cards impedes any size reduction efforts.

BRIEF DESCRIPTION OF THE DRAWINGS

The present invention and the corresponding advantages and features provided thereby, will be best understood and appreciated upon review of the following detailed description of the invention, taken in conjunction with the following drawings, where like numerals represent like elements, in which.

DETAILED DESCRIPTION OF THE INVENTION

Briefly stated, the present invention is directed to an apparatus configured to hold multiple "smart" cards therein, while at the same time exhibiting a reduced footprint. In an exemplary embodiment, the multiple card holding apparatus of the present invention includes a first bracket, a second bracket oriented in opposition to the first bracket, and a separation member disposed between the first bracket and the second bracket forming a first holding region and a second holding region, with the first bracket and the second bracket. The first holding region and the second holding region are configured to hold a pair of smart cards in a vertically stacked manner relative to one another. With this configuration, the multiple card holding apparatus of the present invention finds utility in both mobile or portable devices, where size is at a premium, and non-mobile devices alike.

Figure 1:
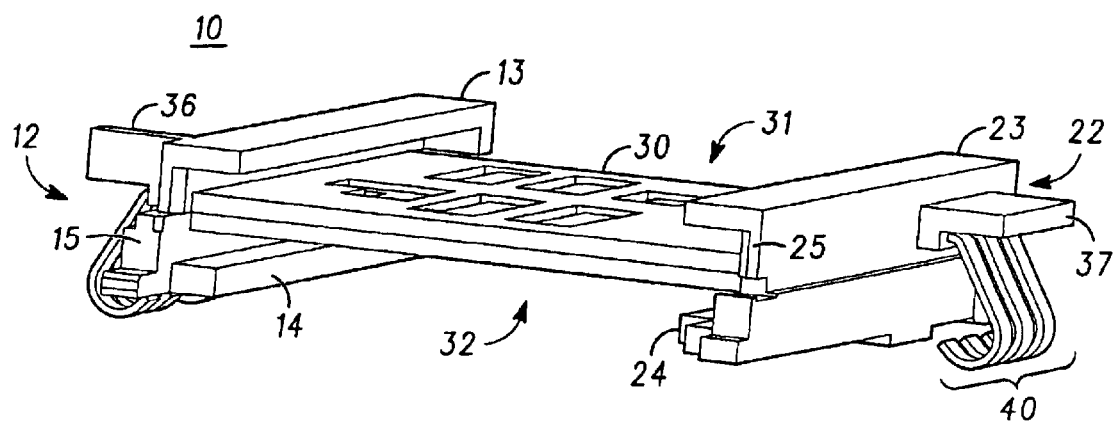
FIG. 1 is a perspective view of the card holding apparatus according to an exemplary embodiment of the present invention.

An exemplary embodiment of the present invention will now be described with reference to FIGS. 1–7. FIG. 1 is a perspective view of the card holding apparatus according to the present invention, represented as a dual subscriber identity module (SIM) card holder 10. The card holder 10 includes a first bracket structure 12, a second bracket structure 22, oriented parallel to and in opposition to the first bracket structure 12 and a separation member 30 contiguously disposed between the first bracket structure 12 and the second bracket structure 22. The separation member 30, together with the first bracket structure 12 and the second bracket structure 22 defines a first holding region 31 and a second holding region 32 that are in-line and configured to slidingly engage a corresponding SIM card or suitable electronic element.

The first bracket structure 12 is a c-shaped bracket including a top portion 13, a bottom portion 14 and an intermediate portion 15 interconnecting the top portion 13 and the bottom portion 14. A first lever 36 is integrally formed along the intermediate portion 15. The second bracket structure 22 is a c-shaped bracket including a top portion 23, a bottom portion 24 and an intermediate portion 25 interconnecting the top portion 23 and the bottom portion 24. A second lever 37 is integrally formed along the intermediate portion 25. The separation member 30 is disposed between the intermediate portion 15 of the first bracket structure 12 and the intermediate portion 25 of the second bracket structure 22. In this manner, the separation member 30 is shared by the first holding region 31 and the second holding region 32.

The footprint of the first holding region 31 and the second holding region 32 are substantially similar to conventional SIM cards; therefore, in application, the card holder 10 of the present invention is capable of holding multiple SIM cards, one over the other, in a vertically stacked manner in an area having a footprint substantially the same as that of a single SIM card, or other suitable electronic element. This is in contrast to conventional card holders where the application of two or more cards would take up at least twice the area of a single card holder. Therefore, the card holder 10 of the present invention takes up less than half the surface area required to accommodate conventional multi-card holding mechanisms.

Although the card holder 10 is described as including a pair of brackets oriented in opposition to one another, various alternative configurations capable of maintaining multiple cards or electronic elements in a substantially vertically stacked manner such as, for example, the first and second brackets being offset from one another are contemplated by the present invention and are within the spirit and scope of the present disclosure. Further, the bracket structure 12, 22 is not construed to be limited to c-shaped brackets, but can be any structure capable of maintaining a portion of a SIM card or other suitable electronic device therein such as, but not limited to, I-brackets, L-brackets or S-brackets.

Moreover, the card holder 10 of the present invention should not be limited to a structure where the separation member 30 is shared by the holding regions 31, 32. For example, a card holder having a structure where the separation member is not shared by, but is placed or otherwise disposed between separate bracket structures is contemplated by the present invention and is within the spirit and scope of the present disclosure.

Figure 2:
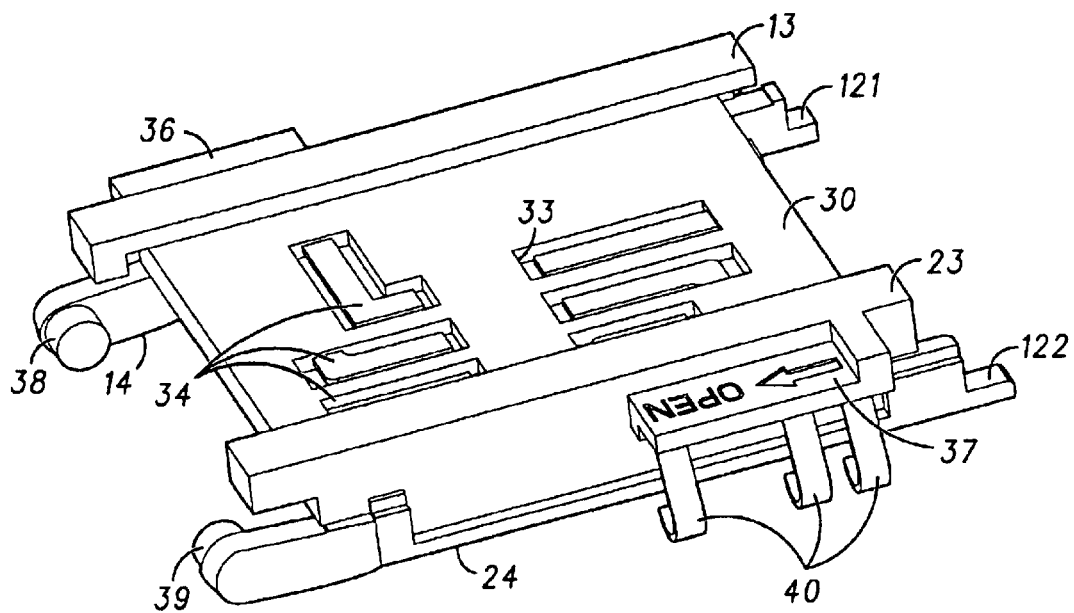
FIG. 2 is a perspective top view of the card holding apparatus according the an exemplary embodiment of the present invention.
Figure 3:
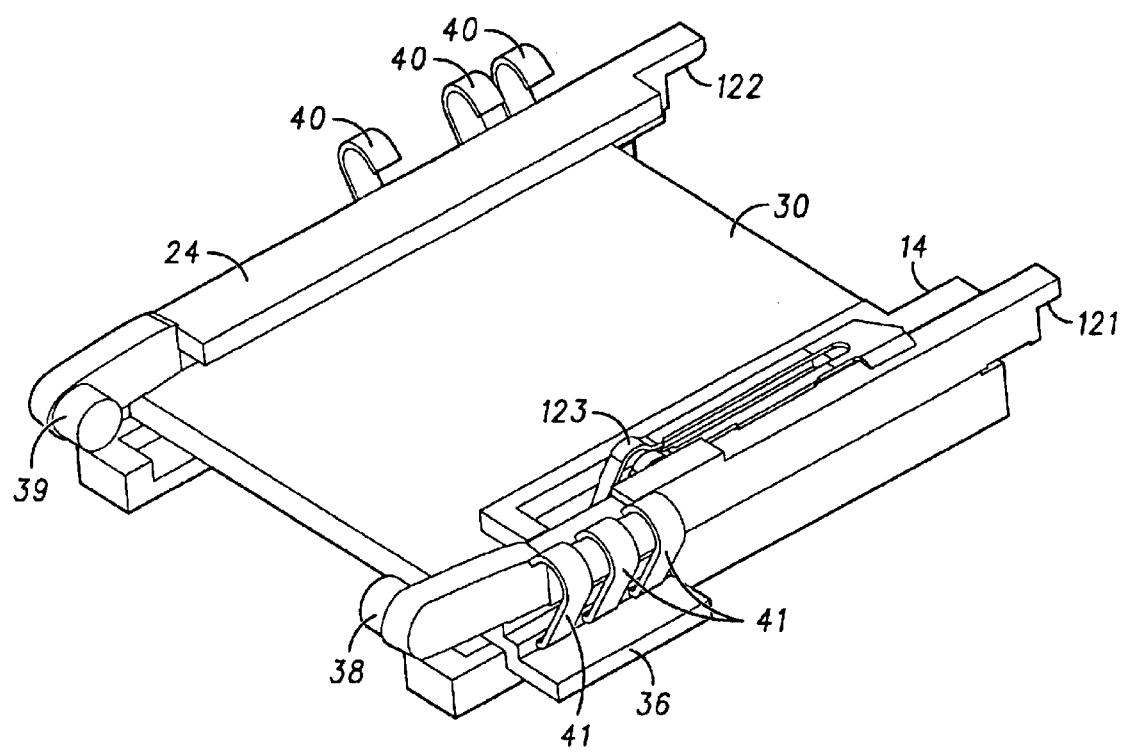
FIG. 3 is a perspective bottom view of the card holding apparatus according to an exemplary embodiment of the present invention.
Figure 4:
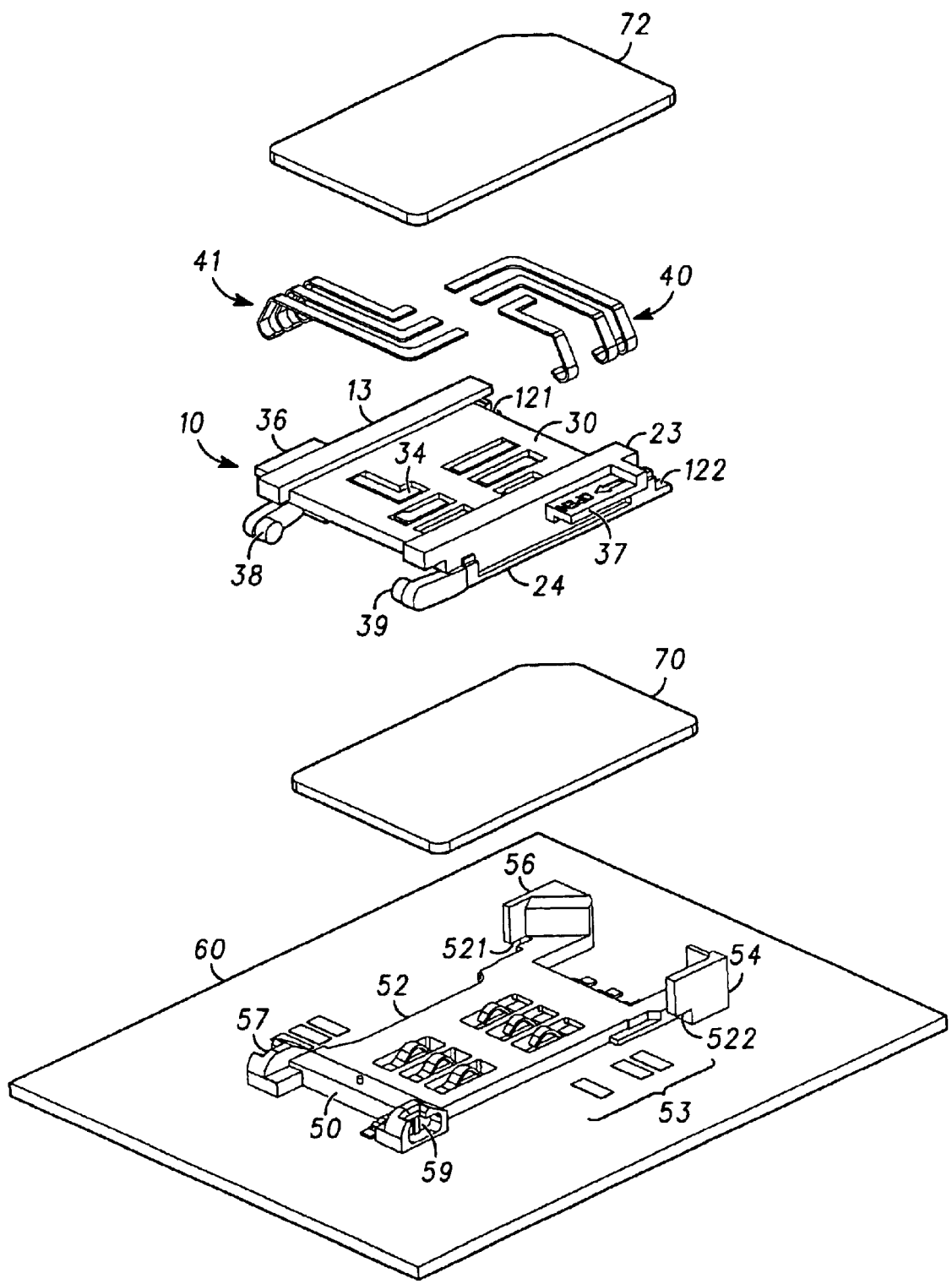
FIG. 4 is an exploded view of the components of the card holding apparatus according to the present invention.

Referring to FIGS. 2–4, the separation member 30 has a central cavity (not shown) configured to maintain electrical conductors 34 therein. The electrical conductors 34 provide electrical signals to the SIM card or other suitable electronic device maintained within the first holding region 31 through at least one opening 33 formed in the separation member 30. The electrical conductors 34 are coupled to respective first and second contact members 40, 41 that extend from the card holder 10 and provide an electrical contact to corresponding electrical interconnections 53 of a host, such as a printed circuit board 60 of a portable device. Additionally, the first and second contact members 40, 41 provide a spring bias force against the card holder 10 when the card holder 10 is in operating position (e.g. engaged) relative to a host, such that when the card holder 10 is disengaged from the host or a component on the host, as described in greater detail below, the card holder 10 is slightly biased in an upwards (e.g. away from the host) direction to promote easy removal of the SIM cards or other suitable electronic devices from the card holder 10. FIG. 4 shows the first and second contact members 40, 41 being external to the separation member 30, to illustrate that the first and second contact members 40, 41 provide an electrical contact between the SIM card 72 maintained within the first holding region 31 and the electrical interconnectors 53. However, in application, the first and second contact members 40, 41 are maintained substantially within the central cavity (not shown) of the separation member 30, and extend from the card holder 10.

The bottom portion 14 of the first bracket structure 12, includes an attachment member 38 at one end thereof configured to slidingly engage a corresponding connection portion 57 of a base connector 50. The bottom portion 24 of the second bracket structure 22 includes an attachment member 39 at one end thereof configured to slidingly engage a corresponding connection portion 59 of the base connector 50. The attachment members 38, 39 when engaged with the corresponding connection portions 57, 59 of the base connector 50 form a pivot mechanism having an axis of rotation represented by line A—A (FIG. 5), which provides for the card holder 10 being rotationally positioned between an engaged (e.g. operating) and disengaged (e.g. open or non-operating) position relative to a base 52 that is located on the printed circuit board 60. At the end opposite attachment member 38, a first tab member 121 extends from the bottom portion 14 of the first bracket structure 12. At the end opposite attachment member 39, a second tab member 122 extends from the bottom portion 24 of the second bracket structure 22. An electrical contact 123 is configured as a switch and connected to the bottom portion 14 of the card holder. As a switch, the electrical contact 123 detects that a card has been inserted in one half of the card holder, such as holding region 32. When the switch detects that a card is present, software operations or other card dependent operations can be activated (or deactivated when the card is removed). Such a switch may be similar to those in use with single card holders.

Figure 5:
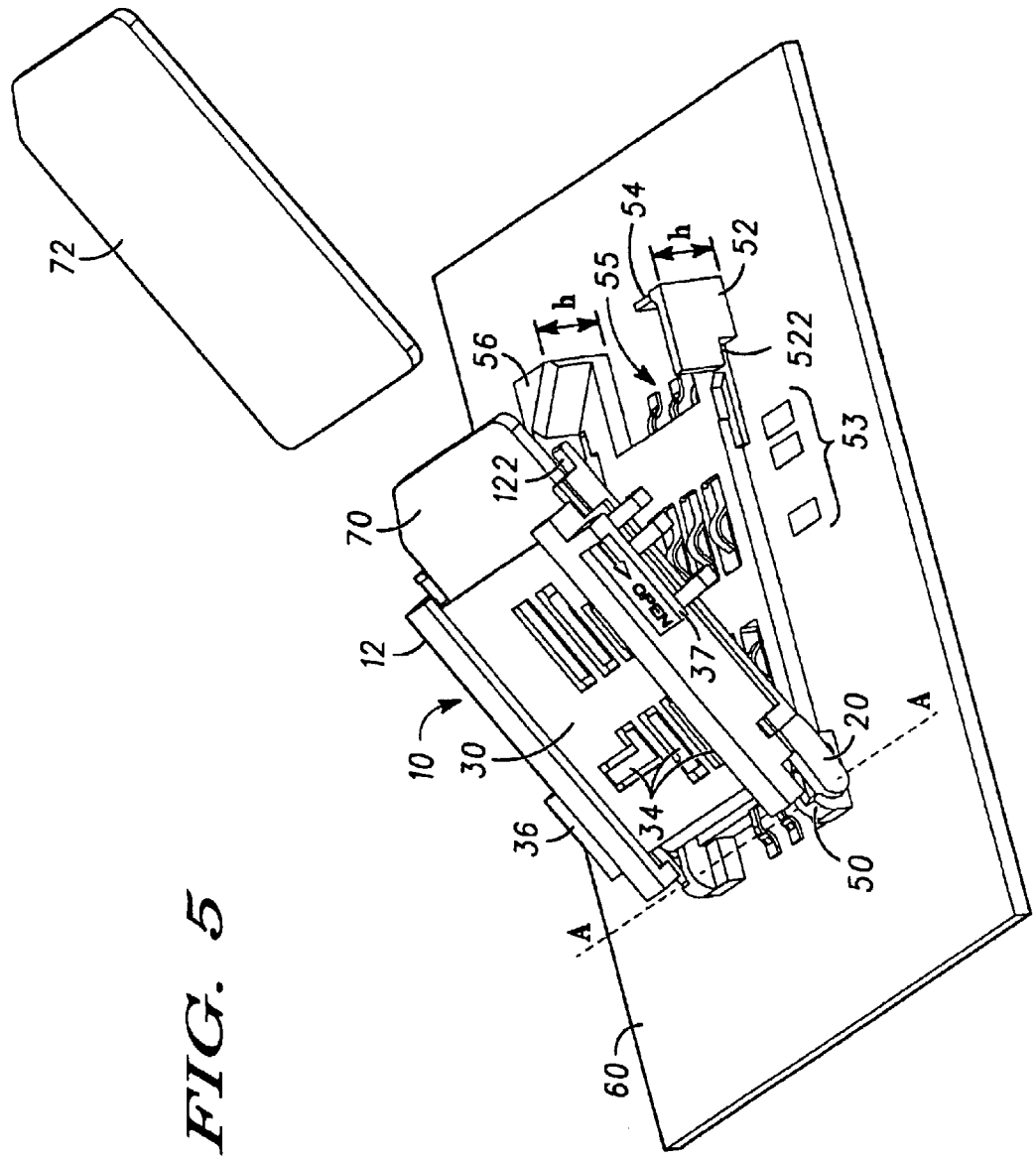
FIG. 5 is a schematic block diagram of the card holding apparatus according to the present invention in a non-operating position relative to a printed circuit board.

FIG. 5 is a schematic block diagram of the card holder 10 in an open (e.g. non-operating) position relative to a printed circuit board 60. The base 52 is located on the printed circuit board 60, and is configured to maintain the SIM cards held within the card holder 10. As illustrated, the base 52 includes a first holding portion 54 having a lip 522 formed therein. The base 52 also includes a second holding portion 56 having a lip 521 (FIG. 4) formed therein. The first and second holding portions 54, 56 each have a corresponding height (h) sufficient enough to maintain the corresponding edges of the SIM cards 70, 72 on the printed circuit board 60. Also shown is at least one third contact member 55, which provides an electrical connection, for example, to the SIM card 70 maintained within the second holding region 32.

Disengaging the card holder 10 from the base 52 is accomplished, for example, by the user sliding the card holder 10 away from the first and second holding portions 54-56 by exerting an appropriate amount of force on at least one of the levers 36, 37 until the first and second tab portions 121, 122 are separated from the corresponding lips 521, 522 of the base 52. Once separated from the lips 521, 522, the spring bias force from the first and second contact members 40, 41 causes the card holder 10 to raise slightly away from the base 52, such that the SIM cards 70, 72 may be removed from the card holder 10. Correspondingly, if one of the first and second holding regions 31, 32 is empty, a SIM card or other suitable electronic device may be placed within the empty holding region when the card holder 10 is disengaged from the base 52. As shown, a first SIM card 70 is located substantially within the second holding region 32; whereas a second SIM card 72 is separated from the first holding region 31 to illustrate the location of the electrical conductors 34 provided within the separation member 30.

Figure 6:
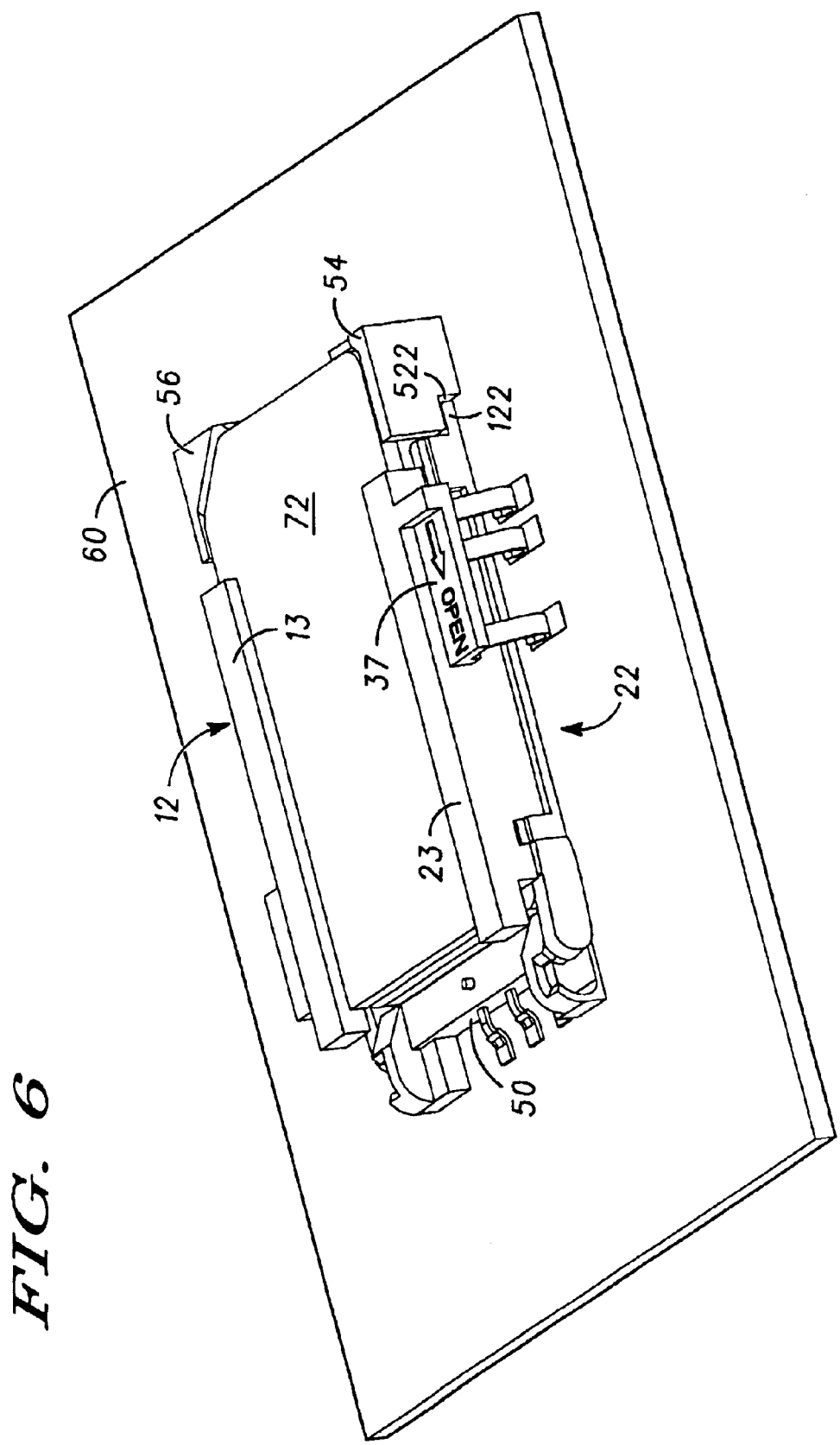
FIG. 6 is a schematic block diagram of the card holding apparatus according to the present invention in operating position relative to a printed circuit board.

FIG. 6 is a schematic block diagram of the card holder 10 in operating (e.g. engaged) position relative to the printed circuit board 60. As illustrated, at least one of the SIM cards 72 is maintained within the base 52 so as to be in operating position with respect to the device or component containing the printed circuit board 60. The card holder 10 is placed in the operating position, for example, by the user providing a downward force on the lever 37 until the card holder 10 is substantially parallel to the printed circuit board 60 and then sliding the card holder 10 towards the base 52 until the first and second tab portions 121, 122 of the card holder 10 are located substantially underneath the corresponding lips 521, 522 of the first and second holding portions 54, 56 of the base 52. The spring bias force provided by the first and second contact members 40, 41 causes the first and second tab portions 121, 122 to press against the lips 521, 522 of the base 52; thereby, latching the card holder 10 in operating position relative to the base 52 and the printed circuit board 60.

By using the card holder 10 of the present invention, multiple smart cards can be positioned relative to a printed circuit board 60 in a vertically stacked manner within a substantially similar footprint to that of a single smart card. Thus, increased functionality can be provided within a corresponding device while taking up substantially the same amount of area as a single smart card. Thus, the additional real estate provided on the printed circuit board 60 by not having multiple smart cards located side-by-side on the same plane, provides for the ability to increase functionality of the underlying device.

The exemplary card holder 10 is made of a two piece construction where the central cavity is formed when the two pieces are combined. The electrical conductors 34 and the first and second contact members 40, 41 are positioned within an area of at least one of the two pieces before the pieces are combined (e.g. glued, heat treated, or other suitable manufacturing process) to form the card holder 10. Alternately, the card holder 10 may be formed from a single piece of molded material. Such alternate, and analogous constructions, will be readily understood by one of ordinary skill in the art and such constructions are contemplated by the present disclosure and are within the spirit and scope of the present invention. Although the present invention has been described with reference to a card holder rotationally engaging a base structure, one of ordinary skill in the art will recognize and appreciate that the card holder of the present invention can be connected to the base structure or appropriate electrical connections or connectors in a snap-fit fashion or other manner as suitable for the particular application. Such alternate connection mechanisms and schemes are contemplated by the present disclosure and are within the spirit and scope of the present invention.

Additionally, although described as having the base connector 50 located along a first bottom edge of the card holder 10, one of ordinary skill in the art will recognize and appreciate that a suitable base connector can be located substantially along the length of either the first bracket structure 12 or the second bracket structure 22 of the card holder 10, thereby providing for rotation along the length of the card holder. Such an alternate embodiment, and those analogous thereto are contemplated by the present disclosure, and thus are within the spirit and scope of the present invention.

Figure 7:
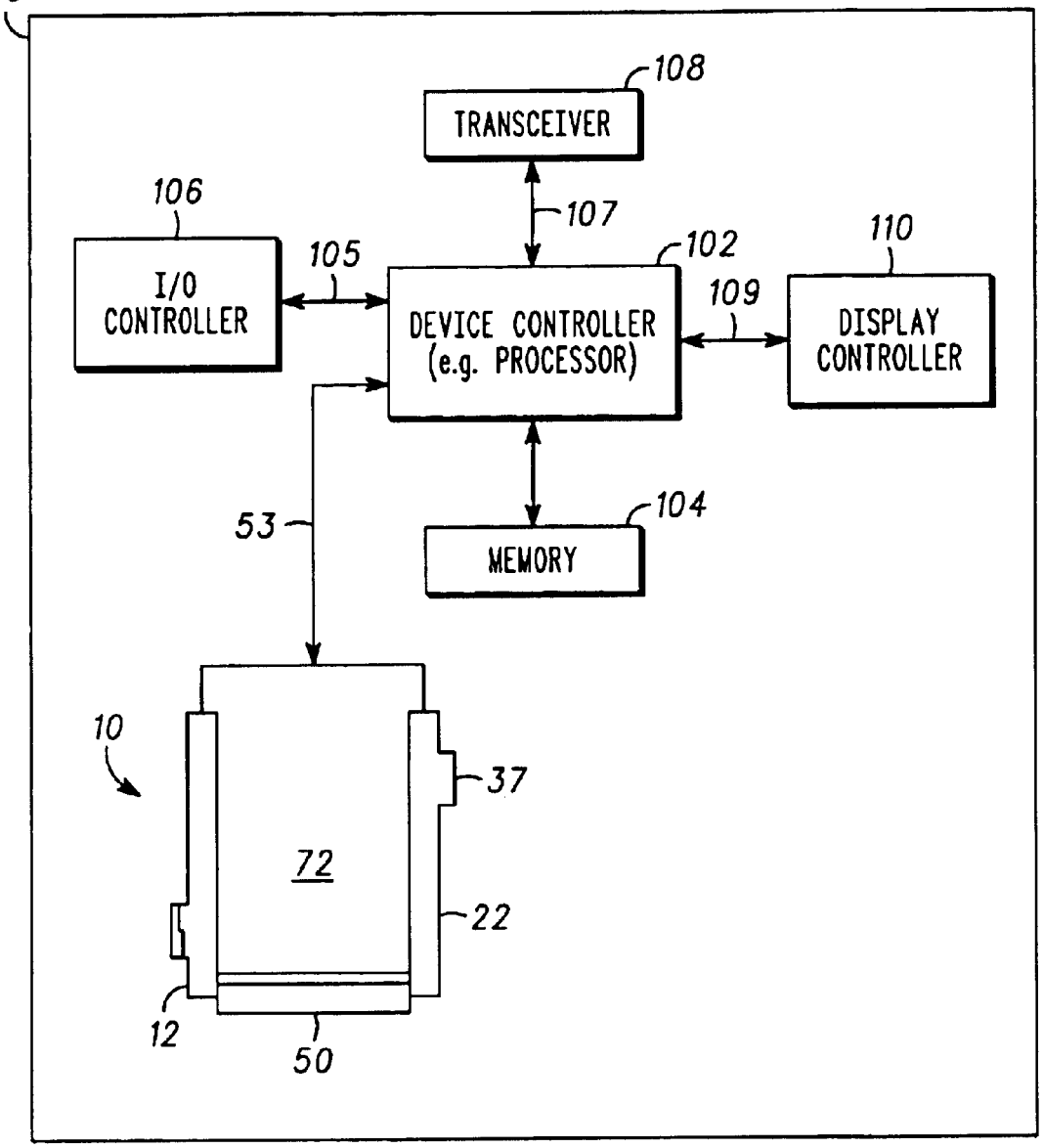
FIG. 7 is a schematic block diagram of a mobile communication device incorporating the card holding apparatus of the present invention.

FIG. 7 is a schematic block diagram of a mobile communication device 100 incorporating the card holder 10 of the present invention. The mobile communication device 100 can be embodied as any device, such as portable electronic devices, cellular telephones, pagers, palm top computers, lap top computers, or the like that require an electronic card, such as SIM card 72, a smart card, memory card or the like, or a combination of such cards. The card holder 10 is particularly advantageous in a cellular telephone because cellular telephones are very compact communication devices wherein it is desirable to accommodate more than one card to enable maximum flexibility in the smallest possible volume for a very compact form factor. The mobile communication device 100 includes the card holder 10, a device controller 102, a memory 104, an input/output (I/O) controller 106, and a transceiver 108. The mobile communication device 100 may include a display controller 110 which is operable to control the formatting and display of data on a suitable display (not shown) based on display control signals 109 provided by the device controller 102. Each of the aforementioned components is illustrated as being maintained (e.g. carried) on a single printed circuit board 60 that is carried within a device housing (not shown). However, it will be appreciated by those of ordinary skill in the art that the components may be maintained on several printed circuit boards or other suitable mechanisms.

The device controller 102, represented as a processor, is operable to control the operation of the mobile communication device 100. The device controller 102 may be may be implemented in any suitable structure such as, but not limited to, a single processor, a plurality of processors, a digital signal processor, a dedicated piece of hardware (e.g. ASIC), discrete logic circuitry, state machine or any device that manipulates signals based on operational instructions or software executing on one or more processing devices. The operational instructions or software and any corresponding data related thereto would be stored in the memory 104, which may include a single memory device or a plurality of memory devices. Such a memory device may include any element that stores digital data including, but not limited to, RAM, ROM, CD-ROM and/or any storage medium that stores digital information.

Transmission or receiving information 105, for example, a cellular number to be dialed or the acceptance of an incoming call from a wireless network is provided to the device controller 102 by the I/O controller 106. The cellular number may be provided, for example, by a user depressing numerical or other suitable keys on a keypad (not shown) which, in turn, provide electrical signals corresponding to the particular number to the device controller 102. Voice and/or image data 107 that is to be transmitted by the mobile communication device 100 is provided to the transceiver 108 by the device controller 102. Voice and/or image data 107 that is to be received by the mobile communication device 100 is provided to the device controller 102 by the transceiver 108. The operation of the I/O controller 106, transceiver 108 and display controller 110 are well known by those of ordinary skill in the art and will not be further discussed herein as not to obscure the disclosure or deviate from the description of the present invention.

The card holder 10 of the present invention is illustrated as being in operating (e.g. engaged) position with respect to the printed circuit board 60, such that one SIM card 72 or two card devices can communicate with the device controller 102. For example, the encryption algorithms, mobile network user identification data or other suitable information maintained within the SIM card 72 may be transferred between the device controller 102 and the SIM card 72 via the electrical interconnectors 53 of the printed circuit board 60. In application, the algorithms and other information stored within the SIM card 72 may be transmitted to the electrical interconnectors 53 via the electrical conductors 34 and at least one of the contact members 40,41 (FIG. 3) of the card holder 10. When the card holder 10 is in non-operating (e.g. disengaged) position relative to the printed circuit board 60, the interconnection between the SIM card 72 and the device controller 102 is broken as the first and second contact members 40,41 (FIG. 3) are disconnected from the electrical interconnectors 53; thereby, preventing the SIM card 72 or other suitable electronic element from communicating with the device controller 102.

The above detailed description of the invention and the examples described therein have been presented for the purposes of illustration and description. It is therefore contemplated that the present invention cover any and all modifications, variations or equivalents that fall within the spirit and scope of the basic underlying principles disclosed above and claimed herein.

What is claimed is:

1. A multiple card holding apparatus, comprising:
   a first bracket structure including a top portion, a bottom portion and an intermediate portion, interconnecting the top portion and the bottom portion;
   a second bracket structure including a top portion, a bottom portion and an intermediate portion interconnecting the top portion and the bottom portion;

a separation member, disposed between the intermediate portions of the first bracket structure and the second bracket structure, the separation member forming a first holding region and a second holding region with the first and second bracket structures; and at least one contact member coupled to the first and second bracket structures, operable so provide an electrical connection extending into the separation member.

2. The multiple card holding apparatus of claim 1, wherein the at least one contact member provides a spring bias to disengage the separation member from a base.

3. The multiple card holding apparatus of claim 1, wherein the bottom portion of at least one of the first and second bracket structures includes an attachment member configured to engage a base connector, wherein the card holding apparatus is rotationally positioned relative to a base.

4. The multiple card holding apparatus of claim 1, wherein the first holding region and the second holding region are each capable of maintaining separate electronic elements in a vertically stacked manner relative to one another.

5. The multiple card holding apparatus of claim 1, further including means for fixedly engaging the separation member to a base connector.

6. The multiple card holding apparatus of claim 1, wherein the first holding region is configured to slidingly engage a first electronic element.

7. The multiple curd holding apparatus of claim 6, wherein the second holding region is configured to slidingly engage a second electronic element, and wherein the first and second electronic elements are maintained in a vertically stacked manner relative to one another while maintained within the first and second holding regions.

8. A mobile communication device, comprising:

a device controller;

a card bolder configured to include a first holding region and a second holding region, wherein the first holding region and the second holding region are each capable of maintaining individual electronic cards in a vertically stacked manner relative to one another, with each electronic card in communication with the device controller, the card holder including a first bracket, a second bracket oriented in opposition to the first bracket, and a separation member disposed between the first bracket and the second bracket, wherein the separation member forms the first holding region and the second holding region with the first bracket and the second bracket the separation member including at least one opening, at least one first contact member extending through the at least one opening to provide an electrical connection for an electronic card in the first holding region a housing;

a circuit board carried in the housing, the device controller carried on the circuit board and the card holder movingly carried on the circuit board to move between an open position for insertion and removal of multiple cards and an engaged position for operation of the device in electrical connection with multiple cards wherein the at least one first contact member and the at least one second contact member connect to the circuit board an different sides of the card holder when the card holder is in the engaged position.

9. The mobile communication device of claim 8, further including a third contact member to provide an electrical connection for an electronic card in the second holding region.

10. The mobile communication device of claim 8, wherein the at least one first contact member and the at least one second contact member comprise a plurality of conductors.

11. The A mobile communication device, comprising:

a device controller;

a card holder configured to include a first holding region and a second holding region wherein the first holding region and the second holding region are each capable of maintaining individual electronic cards in a vertically stacked manner relative to one another, with each electronic card in communication with the device controller, and the card holder includes a first bracket, a second bracket oriented in opposition to the first bracket, and a separation member, disposed between the first bracket and the second bracket, wherein the separation member forms the first holding region and the second holding region with the first bracket and the second bracket; and contact members extending through the first and second brackets and into the separation member and positioned to make electrical connection with a card inserted in the first holding region.

12. The mobile communication device of claim 11, further including a control lever integrally formed on the card holder and operative to control the engagement of the contact members with conductors on a card inserted in the first holding region.

* * * * *

UNITED STATES PATENT AND TRADEMARK OFFICE
CERTIFICATE OF CORRECTION

PATENT NO. : 6,896,548 B2
DATED : May 24, 2005
INVENTOR(S) : Scuteri Ilario et al.

It is certified that error appears in the above-identified patent and that said Letters Patent is hereby corrected as shown below:

Column 7,
Line 7, delete "so" and replace with -- to --.
Line 37, delete "bolder" and replace with -- holder --.

Column 8,
Line 14, delete "an" and replace with -- on --.
Line 24, delete "The".

Signed and Sealed this

Sixteenth Day of August, 2005

JON W. DUDAS
*Director of the United States Patent and Trademark Office*